Fig. 3

June 23, 1931.   L. T. GOLDSBOROUGH   1,811,580
METHOD OF AND APPARATUS FOR MAKING FERRULES
Filed July 17, 1930   11 Sheets-Sheet 5

Inventor
Lilburn T. Goldsborough
by W. T. Schoenborn.
Attorney

June 23, 1931.　　　L. T. GOLDSBOROUGH　　　1,811,580
METHOD OF AND APPARATUS FOR MAKING FERRULES
Filed July 17, 1930　　　11 Sheets-Sheet 7

Inventor
Lilburn T. Goldsborough.
by N. J. Schoenborn,
Attorney

June 23, 1931. L. T. GOLDSBOROUGH 1,811,580
METHOD OF AND APPARATUS FOR MAKING FERRULES
Filed July 17, 1930 11 Sheets-Sheet 9

June 23, 1931.  L. T. GOLDSBOROUGH  1,811,580

METHOD OF AND APPARATUS FOR MAKING FERRULES

Filed July 17, 1930   11 Sheets-Sheet 10

Patented June 23, 1931

1,811,580

UNITED STATES PATENT OFFICE

LILBURN T. GOLDSBOROUGH, OF BALTIMORE, MARYLAND

METHOD OF AND APPARATUS FOR MAKING FERRULES

Application filed July 17, 1930. Serial No. 468,669.

This invention relates to a method of making metallic ferrules for paint, varnish, kalsomine, whitewash, and other brushes; to similar hollow metallic structures; and to a machine for making the same.

The objects of the invention are:

First, the provision of a novel method of handling successive flat metallic blanks, cut from a strip, in such manner that they are bent into proper ferrule shape with their ends bent in, overlapped, and in close contact with each other and soldered together in such position.

Second, the provision of a method of the character indicated which may be quickly, easily, economically, efficiently and automatically effected with but a minimum of successive operating steps of a machine occupying but a minimum of floor space and requiring a minimum of power.

Third, the provision of a process in which all of the necessary steps are effected by a single machine, the finished product being delivered thereby after the final step has been effected therein.

Fourth, the provision of a machine for effecting the several steps in the process in which blanks cut from a flat metallic strip are fed along a horn and in proper relation to certain cooperating mechanism and instrumentalities whereby each blank is correctly formed into proper ferrule shape with its ends caused to be positively, forcibly and unyieldingly overlapped and in contact with each other, and to uniformly apply flux and solder to the overlapped ends to firmly secure them together.

Fifth, the further provision, in a machine of the character specified above, of mechanism for acting upon the ferrules, after the soldering process, to cause them to have flush inner faces with no offsets at the points where the ends of the blanks are overlapped and soldered.

Sixth, the provision of a machine, as set forth, in which the various steps of the method outlined are expeditiously and efficiently effected, one which has but a minimum number of moving parts and no large reciprocating or rotating masses, eliminating dangerous inertia forces to be overcome, and one which is simple in construction and operation, and which may be easily and readily installed, operated, repaired, or adjusted without the employment of particularly skilled mechanics or special tools.

Seventh, other features and advantages of the method and means will be hereinafter apparent and manifest themselves from the following detailed description of the successive steps in the method and the mechanism employed to effect the same, which will now be particularly disclosed and also pointed out in the appended claims.

This invention is illustrated in the accompanying eleven sheets of drawings, in which:

Figure 1 is a view, mainly in side elevation but partly in vertical section, of the major portion of a machine constructed in accordance with the invention;

Figure 1ª is an end elevation of a certain horn and its mounting, and is taken looking in the direction of the arrow Iª, Figure 1;

Figure 1ᵇ is an enlarged vertical sectional view of the edge portion of a certain solder applying roller, and illustrates the configuration of certain ribs thereon;

Figure 1ᶜ is a view similar to and a continuation of Figure 1, the showing of this figure being of that portion of the machine extending outwardly beyond the line C—C of Figure 1;

Figure 1ᵈ is a face view of that portion of the machine illustrated in Figure 1ᶜ, taken looking in the direction of the arrow Iᵈ, Figure 1ᶜ, and with certain other portions of the machine indicated in dot-and-dash lines, in the background;

Figure 1ᵉ is a horizontal sectional view on the line Iᵉ—Iᵉ, Figure 1ᶜ;

Figure 4 is a horizontal sectional view on the line IV—IV, Figure 1;

Figure 4ª is a view, partly in top plan and partly in broken away section, of a certain portion of the mechanism shown in Figure 4;

Figure 5 is a fragmentary view, on a much reduced scale, of portions of the mechanism shown in Figure 4, as associated with their supporting and operating parts;

Figures 10, 10ª and 10ᵇ are fragmentary perspective views of a certain horn and sufficient cooperating mechanism to illustrate the various steps necessary in the entire process;

Figure 11 is a transverse vertical sectional view on the line XI—XI, Figure 10;

Figure 12 is a similar view on the line XII—XII, Figure 10;

Figure 13 is a similar view on the line XIII—XIII, Figure 10;

Figure 17 is a side view of the horn shown in Figure 10;

Figure 17ª is an enlarged view of a part of the lower edge of the same;

Figure 18 is an inverted plan view thereof;

Figures 19ª and 19ᵇ are successive face views of the blank, illustrating stages in its formation;

serving in the final step of the process of forming the ferrule, the parts being shown in inactive position;

Figure 30 is a similar view of a portion of the same, but with the parts shown in active position;

Figure 31 is a side view, partly in section, of these parts;

Figure 32 is a face view of a portion of a certain bridge which cooperates with these parts;

Figure 33 is an enlarged sectional view on the line XXXIII—XXXIII, Figure 1ᶜ; and, Figure 34 is a sectional view on the line XXXIV—XXXIV, Figure 33.

Briefly stated, this invention consists in the method of manufacturing a paint, or other, brush ferrule, or similar hollow metallic structure; and in machinery for effecting the same; wherein a flat metallic blank, cut from a strip, is subjected to successive operations whereby it is first bent into inverted U-form; one of the depending wings is then tucked in; the other wing is then tucked in so as to overlap and be in contact with the end of the first wing; the relation of the overlapping and contacting wing ends is then reversed, the inner one becoming the outer one and vice versa, to insure a firm contact; the overlap is then treated with flux; then soldered; and finally that portion of the outer wing adjacent the soldered overlap is crimped inwardly to form a flush inner face on the finished ferrule. These steps in the operation are performed in the manner and by the mechanism which will now be, in detail and with reference to the drawings, particularly described.

The machine proper is mounted upon and supported by side frames 41, a transverse frame having a rear face 42 and a front face 43, in which various frames are provided, bearings for a main drive shaft 44 and certain other shafts, as will, at intervals, appear, and upon which are mounted certain transverse supports. It is here noted that that end of the machine at which the ferrule forming blanks are supplied is referred to as the "back" of the machine, the opposite end thereof, at which the finished ferrules are delivered, being, consequently, the "front".

Figure 3:
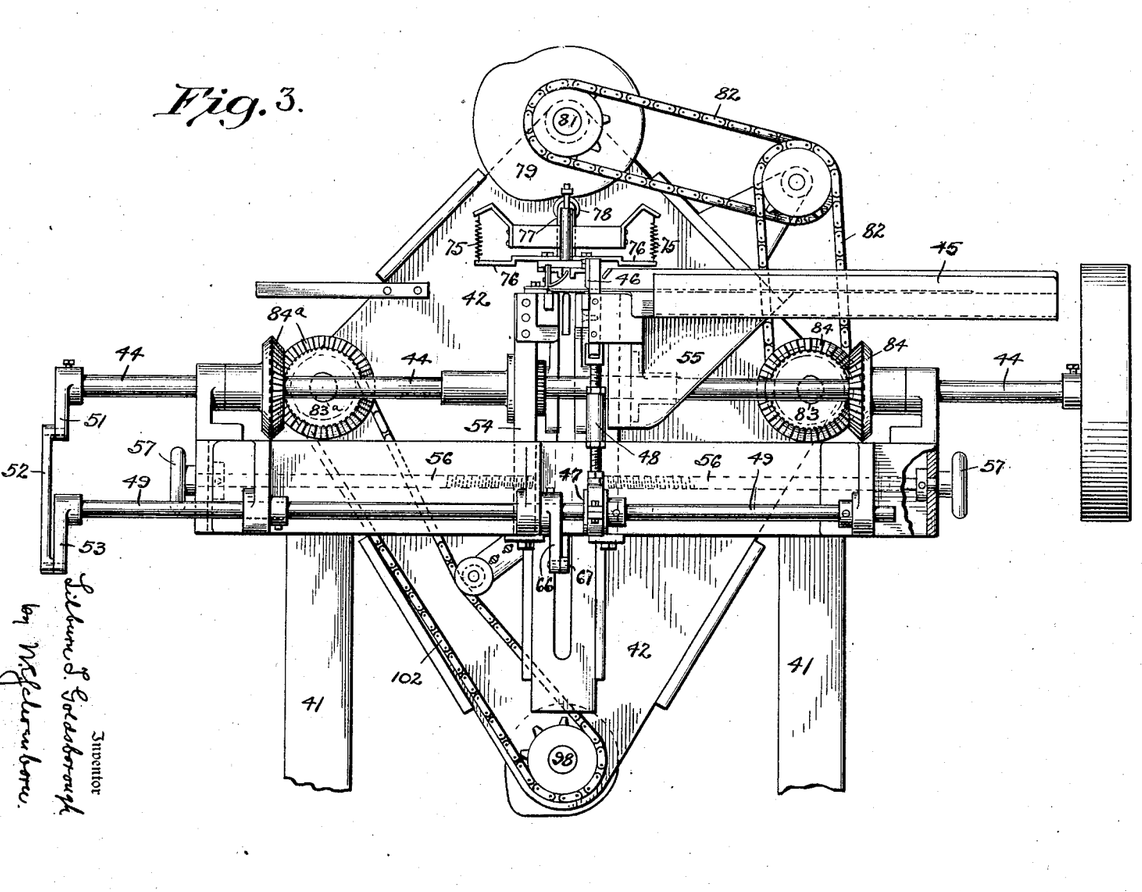
Figure 3 is a rear face view of the major portion of the machine.

The mechanism, which may serve to cut the metallic strip into flat blanks of proper dimensions, may be of any desired type, and inasmuch as such mechanism forms no part of the present invention, it is merely indicated herein in proper relation to the rest of the machine. This mechanism consists of a feed trough 45, at the inner end of which operates a blade 46 to which reciprocating movement is imparted by means of an eccentric 47 and through the medium of an adjustable link 48.

ceives rocking movement from the main drive shaft 44 through the medium of interposed crank arm 51, link 52, and rocker arm 53, as shown in Figure 3. The various parts of this strip cutting mechanism are mounted upon a frame 55, and, in order that the size of the cut blanks may be varied, this frame is adjustable from and towards another frame 54, adjustment of these frames being effected by means of opposed screw stems 56 (Figure 3), the inner ends of which are threadedly engaged with the respective frames and the outer ends of which are provided with hand wheels 57.

As the flat blanks are cut from the strip, they rest upon the upper faces of the frames 54 and 55 and are step-by-step fed therealong by means of spring fingers or dogs 58, upwardly extending, ratchet-like, from reciprocating bars 59, (Figures 1 and 4), as disclosed, for example, in U. S. Patent No. 1,629,813, to Stevenson, dated May 24, 1927, and which is the common practice in this class of inventions and forms no distinguishing feature of the present invention. These spring fingers finally bring the blanks, in turn, to the position shown by dotted lines, at $x$, in Figure 4. (The blanks will, from now on, be referred to in the singular, as "the blank", the treatment of each being identical in its passage through the machine). The blank, when in position $x$, is transversely disposed and above the inner end of the horn 61. This horn is provided, at its inner end, with a depending mounting portion 62 which is bolted, or otherwise secured, to a transverse frame member 63. The main body of the horn is, in cross section, of the nature of an I-beam.

Figures 4, 4A, 5:
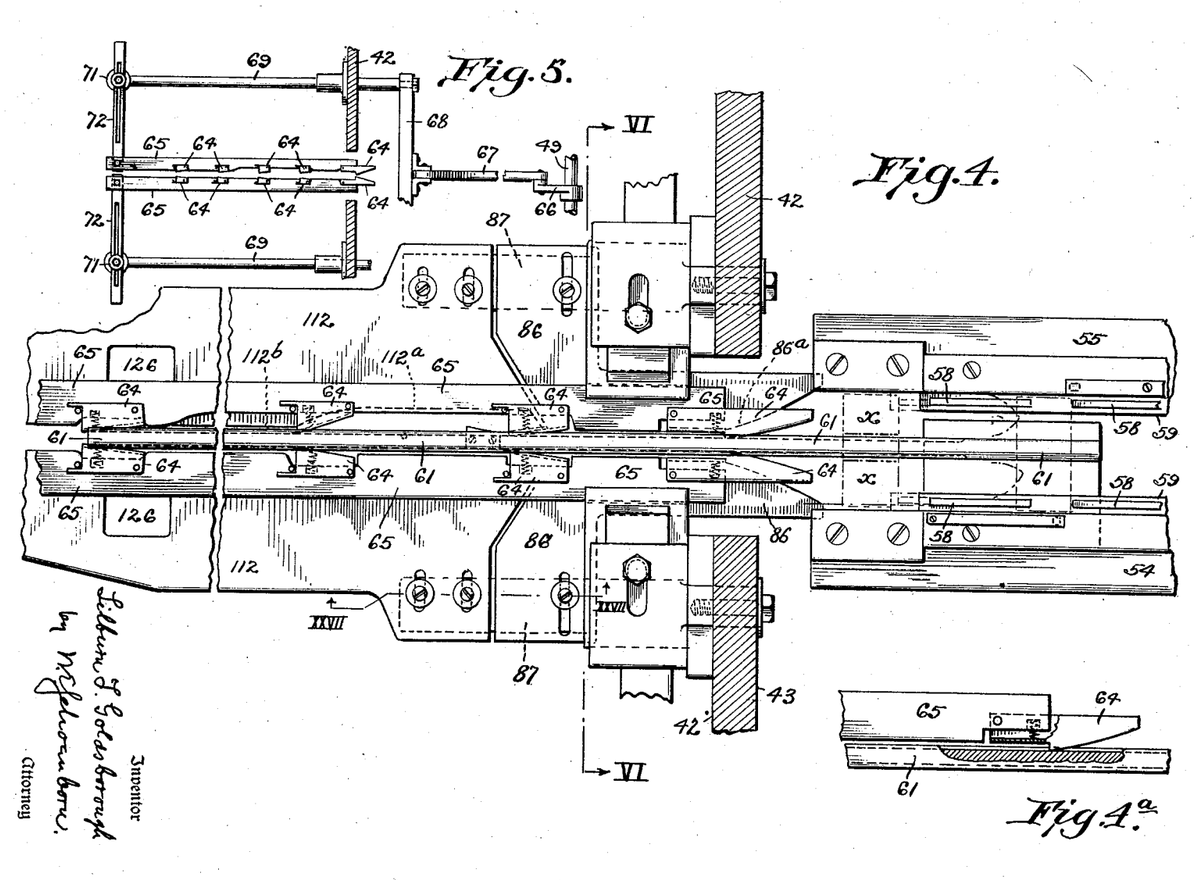

Feeding of the blank from the position $x$ to its final delivery from the machine is effected, in step-by-step manner, by pairs of oppositely disposed spring pressed feeding dogs 64 pivotally mounted (Figure 4) upon a pair of reciprocating feed bars 65 which flank the horn 61. These bars receive their reciprocating movement from the rocker shaft 49 in the manner best shown in Figure 5. Mounted upon the rocker shaft 49 is a rocker arm 66 connected, by means of a link 67 with a cross head 68 secured, at its outer ends, to sliding rods 69. The forward ends of these rods have, adjustably mounted upon them, vertical posts 71 to the upper ends of which are secured inwardly projecting, adjustably mounted bars 72. The dog carrying feed bars 65 are attached, at their forward ends, to these bars 72 and are moved thereby. The feeding dogs 64 are positioned, vertically, substantially in line with the center, or channeled portion of the horn 61. (Figure 4ª). This enables them to secure a rigid grip upon the blank, in feeding it forward along the horn. On the rearward movement, the dogs swing outwardly, against the action of their springs, while passing over the following blank in the series, getting behind the same into gripping position.

Figures 1, 1A, 1B:
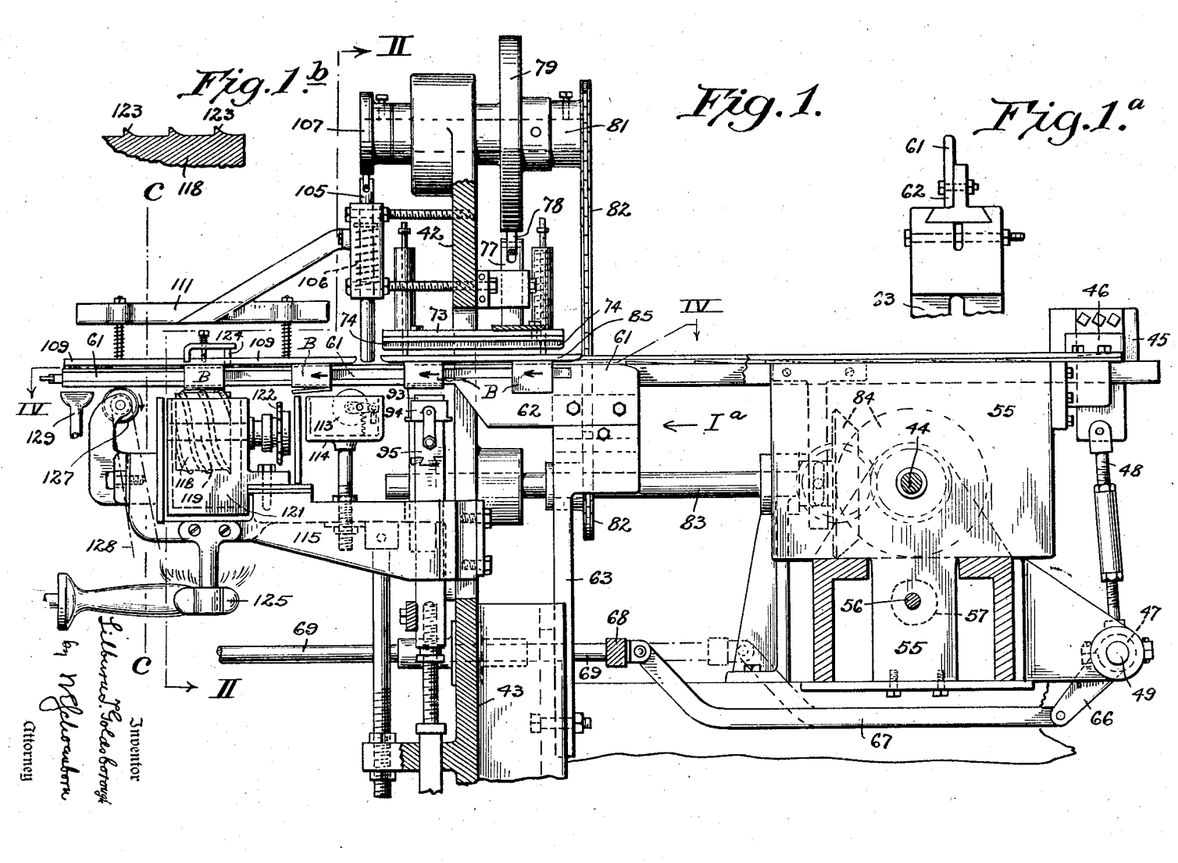
Figures 10, 10A, 10B, 11, 13:
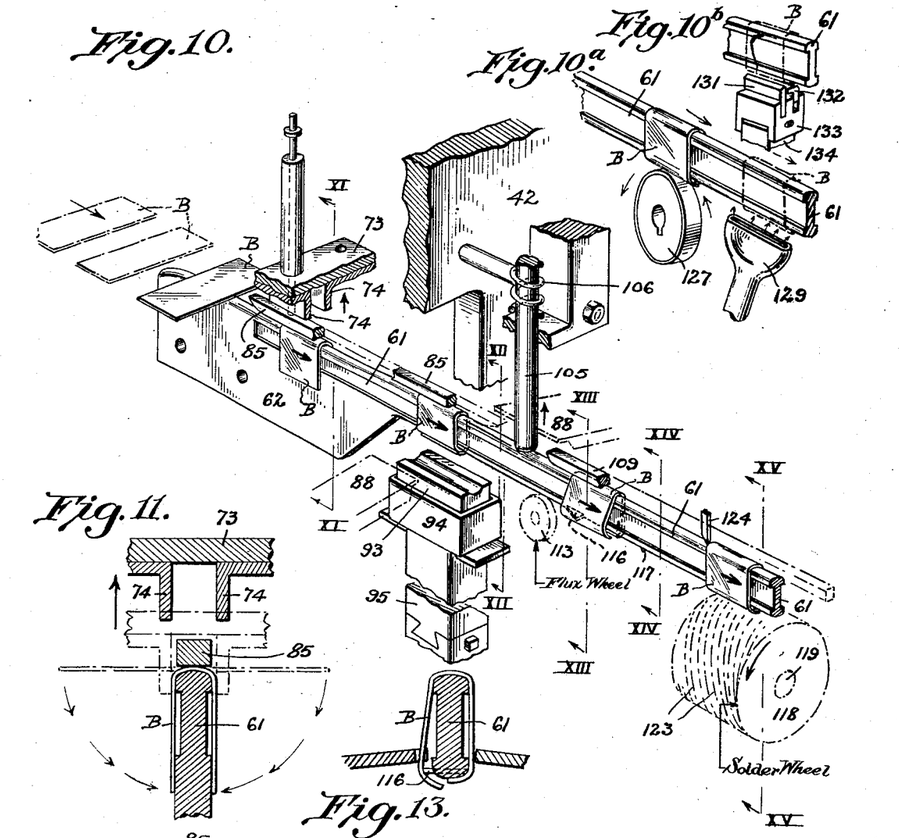

The first operation upon the blank takes place while it occupies the position $x$. (Figure 4). While resting here, it is acted upon by vertically reciprocating wing bending mechanism comprising a cross head 73 to the under face of which are secured a pair of flanged bending rails 74. (Figures 1, 10 and 11). This device is normally in elevated position, being so maintained by means of coiled springs 75 (Figure 3), which engage the outer ends of wings 76 projecting laterally from the cross head 73. This head is provided with an upwardly extending standard 77 which terminates in a roller 78 bearing against a cam 79 mounted upon a shaft 81 (Figures 1 and 3) and, at appropriate intervals and under the action of the cam 79, the cross head is caused to descend, whereupon the flanged rails 74 strike the wings of the blank, bending them down about the horn 61, from the position shown by dot-and-dash lines in Figure 11 to that shown by full lines therein. The shaft 81 is rotated by means of a sprocket and chain connection 82 with a shaft 83 driven by bevel gears 84 from the main drive shaft 44.

Figure 2:
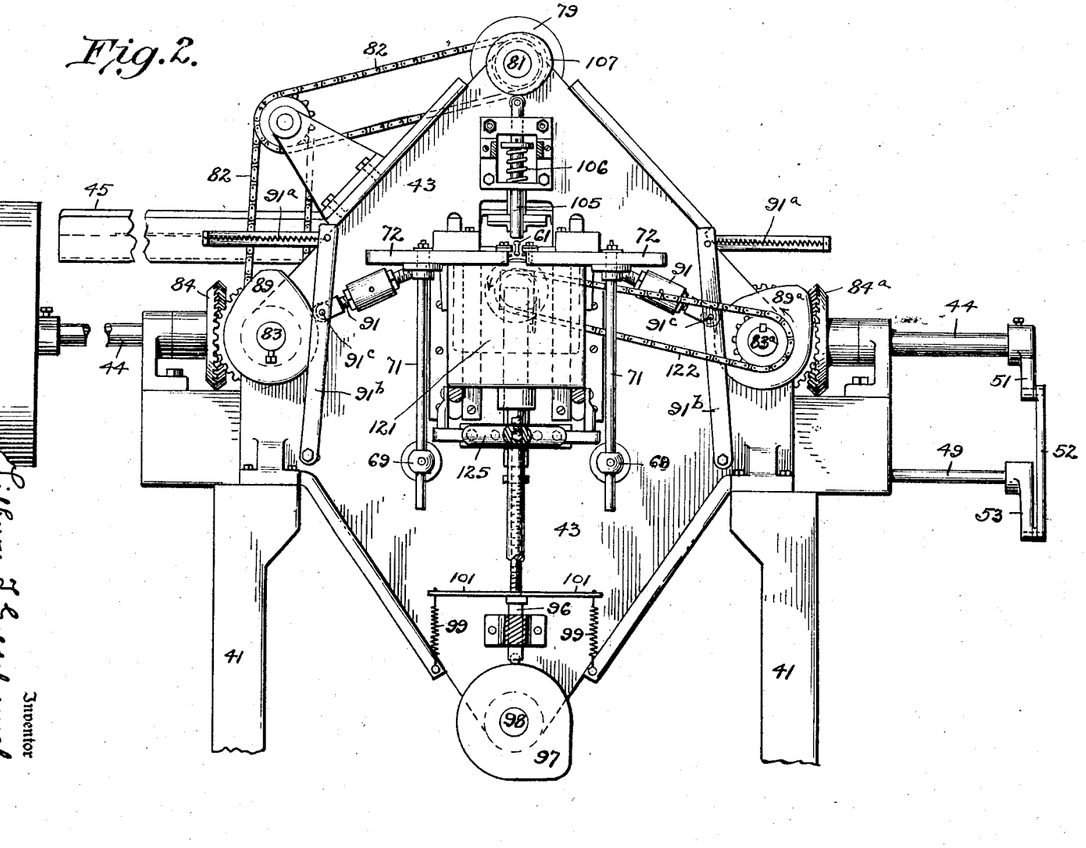
Figure 2 is a front face view, but partly in transverse vertical section, on the line II—II, Figure 1, of the major portion of the machine.
Figure 6:
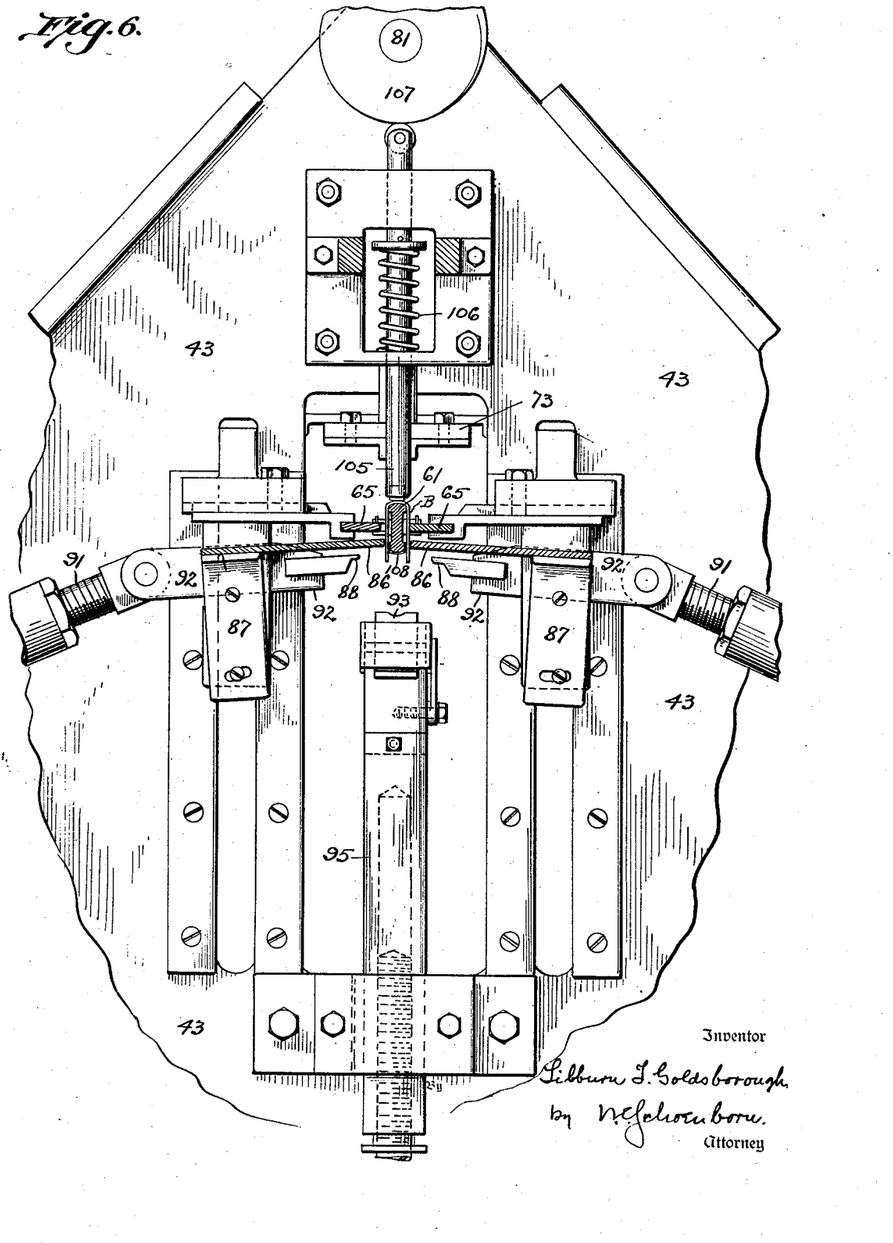
Figure 6 is a transverse vertical sectional view on the line VI—VI, Figure 4.
Figure 7:
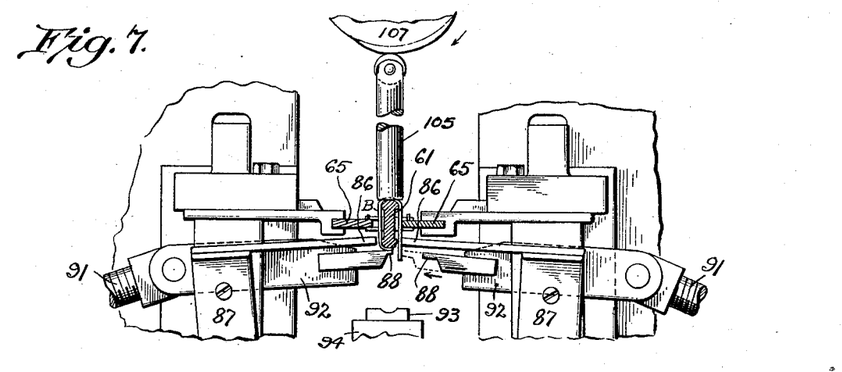
Figure 7 is a view similar to a portion of Figure 6, but showing certain of the parts in a different position.
Figure 8:
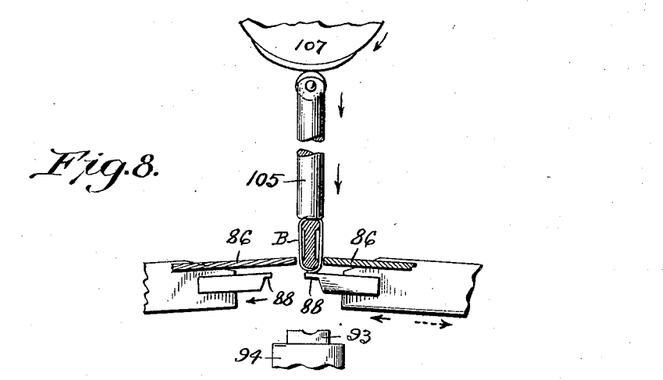
Figure 8 is a similar view but showing the parts in a still different position.

The blank, with depending wings, is then fed to its next position, whereat it is so acted upon as to have the lower ends of its wings bent inwardly, first one then the other, so that they are caused to overlap. During its progress to this point the blank is under the vertically retaining influence of a spring pressed bar 85 yieldingly carried by the cross head 73. This bar prevents vertical displacement of the blank. Also, during this stage of its progress, the blank comes under the laterally retaining influence of the inner guide surfaces 86ª, 86ª, of a pair of inboarded control blades 86 adjustably mounted upon brackets 87 (Figures 6, 7, 25, 26, 27 and 28), and flanking the horn 61. These blades prevent lateral displacement of the blank. As the blank reaches this position and rests, it is triply acted upon. Firstly and secondly, the lower ends of its wings are struck, in succession, by a pair of top forming tucking blades 88, being successively bent inwardly thereby to the desired position. (Figures 6, 7 and 8). The lower end of one wing is first bent in around the lower face of the horn 61 (Figure 7), and then the lower end of the other wing is similarly bent in and over the bent-in end of the first wing. (Figure 8). These actions are effected by means of cams 89 and 89ª (Figure 2) mounted, respectively, upon the shaft 83 and upon a similar shaft 83ª disposed at the opposite side of the machine but similarly driven, by means of bevel gears 84 and 84ª, from the main drive shaft 44. These cams 89 and 89ª bear, respectively, upon rollers carried by the ends of adjustable turnbuckles 91 whose other ends are secured to slidable blocks 92 upon which the respective lap forming tucker blades 88 are mounted. (Figures 2, 6 and 7). The two cams are so timed, in respect to one another, that the blades 88 receive the desired successive actuation, and the rollers are, at all times, maintained in contact with them by the action of springs 91$^a$ (Figure 2) secured to the upper ends of bars 91$^b$, which are, at their lower ends, pivotally mounted upon the front frame 43 and which are provided, intermediate their length, with bearings 91$^c$ for the rollers at the outer ends of the turn buckles 91.

Figure 9:
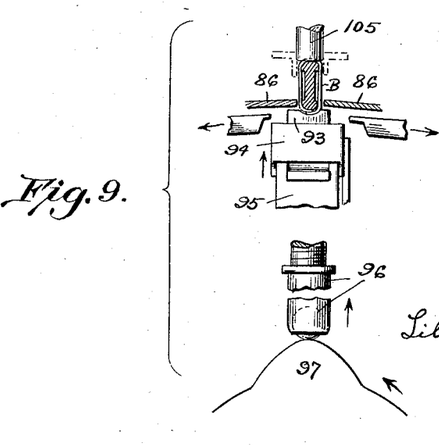
Figure 9 is a similar view but showing the parts in yet another position.

After the wing ends are overlapped, as just described, the third phase of the operation is effected. To insure that a firm contact between the overlapped ends be attained, the overlapped portion is now struck a sharp blow by a hammer block 93 adjustably and rockingly mounted within a frame 94 secured, loosely, upon the upper end of a slidably mounted bar 95 (Figures 1, 2, 6, 7, 8, 9, 10, 20, 21, 22 and 23), which bar is, in turn, adjustably mounted upon a plunger 96 (Figures 2 and 9), carrying a roller at its lower end contacting with the face of a cam 97 mounted upon a shaft 98. The plunger 96 is normally held in down, or retracted, position by means of springs 99 which engage the outer ends of wings 101 carried by the upper end of the plunger. The shaft 98 is rotated by means of a sprocket and chain drive 102 (Figure 3) from the shaft 83$^a$.

In order that the blow of the hammer upon the overlapped portion of the blank be of equal intensity from end to end, the hammer, adjustably mounted in the frame 94, is provided with an arcuate base 103 (Figure 21) adapted to rock upon the upper face of a plate 104 secured to the upper end of the bar 95. This construction renders the hammer self-levelling and insures the desired characteristic of its blow.

At the time the hammer blow is struck, it is desirable, even imperative, that the horn 61 be held in absolutely rigid position and proof against upward spring or yielding. This is effected by means of a plunger 105 (Figures 1, 2, 6, 7, 8 and 10) normally held in elevated position by means of a spring 106 but provided, at its upper end, with a roller contacting with a cam 107 mounted on the shaft 81. This cam is synchronized with the cam 97 in such wise that the plunger 105 will be depressed and held firmly against the upper face of the horn at the time the hammer blow is administered.

Figures 17, 17A, 18:
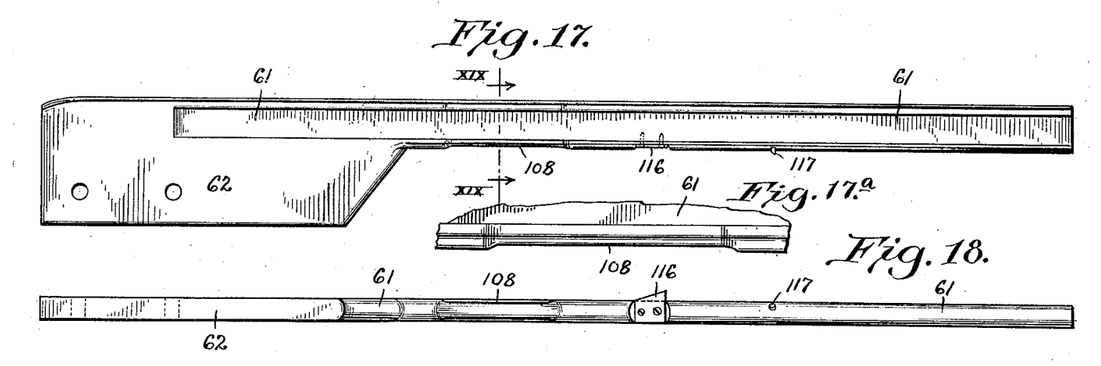
Figure 19:
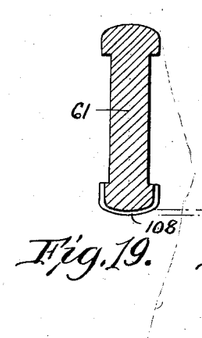
Figure 19 is a transverse sectional view, on an enlarged scale, on the line XIX—XIX, Figure 17.
Figure 19A:
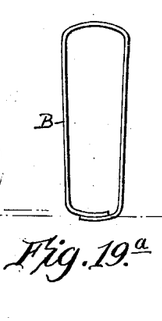
Figure 19B:
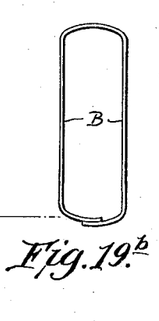
Figure 20:
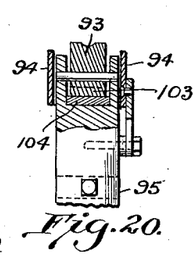
Figure 20 is a face view, partly in section, of a certain hammer forming part of the machine.
Figure 21:
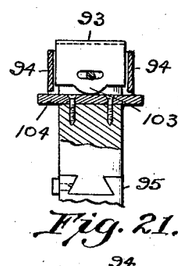
Figure 21 is a similar side view thereof.
Figure 22:
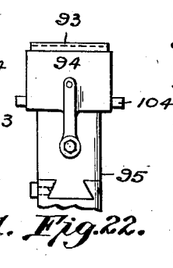
Figure 22 is a complete side view of the same.
Figure 23:
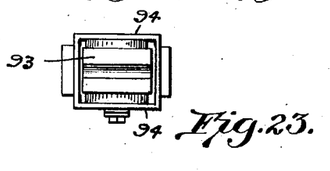
Figure 23 is a top plan view of the hammer.

In order to allow compensation for the natural spring and resiliency of the metal of the blank, the horn, at the point where the foregoing operation takes place, has its lower portion somewhat cut away, both on the sides and underneath, as shown at 108. (Figures 6, 17, 17$^a$, 18 and 19). This permits the fingers 88 to bend the wings of the blank inwardly beyond the perpendicular, in tapered relation, as shown in Figure 19$^a$. As soon as the fingers are retracted, after the striking of the hammer blow, the inherent resiliency of the metal causes the blank to assume the configuration shown in Figure 19$^b$, with its side wings perpendicular and parallel, which is the result desired.

The next stage of operation finds the blank again moved forwardly along the horn. During this movement it passes the vertical restraint of the bar 85 to the similar restraint of a similar bar 109, (Figures 1 and 10), spring mounted upon a bracket 111. The blank also passes from the lateral restraint of the surfaces 86$^a$, 86$^a$ of the inboarded control blades 86, see Figure 25, to the similar restraint of another pair of outboarded control blades 112, (Figures 4 and 25) similar in function to the blades 86 and likewise adjustably mounted upon the brackets 87. Said blades 112, 112 are provided with inner guiding surfaces 112$^a$, 112$^a$, which give clearance and allow the spreading lug 116 on horn 61 to separate the lower overlapped free ends of the blank and with the cooperation of the depressing pin 117 on horn 61 the relative positions of the ends of the blank are changed for purposes to be hereinafter more particularly described.

During this period of the traverse of the blank, there is applied to its overlapped portion a coating of flux, this coating being applied by means of a friction wheel 113, (Figures 1 and 10) or similar device, which is rotatably and adjustably mounted upon a transverse shaft inside of a flux tank or reservoir 114 adjustably mounted upon a bracket 115. (Figure 1).

Figures 14, 15, 16:
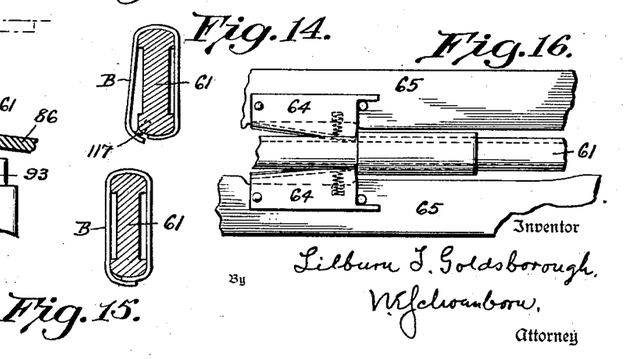
Figure 14 is a similar view on the line XIV—XIV, Figure 10.
Figure 15 is a similar view on the line XV—XV, Figure 10.
Figure 16 is a fragmentary top plan view of certain blank feeding dogs forming part of the machine.

Immediately after the application of the coating of flux, the overlapped ends of the blank are reversed, that is, the wings of the blank are reversed, that is, the inner end at the overlap is caused to assume the outside position, and vice versa. This reversal of ends not only results in a more widespread and even distribution of the flux coating but insures a most close and tight contact of the overlapping ends as a result of the tendency towards outward thrust of the now inner end and the corresponding tendency towards inward thrust of the now outer end. To effect this reversal of ends, a laterally extending inclined spreading block 116 (Figures 10, 13, 17 and 18) is secured to the under face of the horn 61. This lug extends towards the side originally occupied by the inner end of the overlap, and, as the blank is carried along the horn, this inner end is spread laterally and downwardly, out of overlapping position. (Figures 10 and 13). Naturally, upon its release from the influence of the block 116, it must return to an outside relation with the end of the opposite wing. In order that this return be not too abrupt, with the possibility of abutting, rather than overlapping, ends, a depressing pin 117 (Figures 10, 14, 17 and 18) is projected from the horn 61 at a point further along than the block 116, but sufficiently close thereto that the spread end may not snap back therebetween. The spread end rides over this pin 117, as shown in Figure 14, and is thus gradually eased back into its desired outside overlapping position, as shown in Figure 15, and is pressed tightly against the horn by the inner surfaces 112$^b$, 112$^b$ of the outboarded control blades 112, 112, see Figure 25.

With the ends of the wings of the blank now flux treated and properly and tightly frictionally overlapped, they are, during the next step in the process, soldered together. This is accomplished by means of a rotating soldering wheel 118 (Figures 1, 1$^b$, 2, 10 and 24) positioned below the horn 61, mounted upon a longitudinal shaft 119 within a pot or reservoir 121 for molten solder, and driven by a sprocket and chain drive 122 (Figures 1, 2 and 24) from the shaft 83$^a$. To insure a thorough and complete application of molten solder to the overlapped ends of the wings of the blank, the wheel 118 is provided, upon its periphery, with an upstanding rib 123 (Figures 1, 1$^b$, 10 and 24) which rib is, in cross section, inclined upon one face and abrupt upon the other, as best shown in Figure 1$^b$. As the wheel rotates, the bearing point of the rib upon the overlapped ends travels toward the rear and in the direction of the inclined face of the rib. The molten solder is thus gradually forced against the ends and between the overlapped portions, with progressively increasing pressure, insuring the desired application of solder and creating a firm and rigid union or joint of the overlapped ends. To prevent the rearward drag of the rib 123 from displacing or moving the blank rearwardly along the horn, the restraining bar 109 is provided with a spring catch 124 (Figures 1 and 10) under which the blank may freely pass, in its forward movement, but which will snap down in back of the blank and hold it in proper position.

The solder pot or reservoir is mounted upon the bracket 115, and the solder is maintained in molten condition by heat from a burner 125 (Figure 1), also mounted upon the bracket 115, and to which gaseous or liquid fuel of any available type is supplied from any convenient source. To provide ready access to the interior of the pot 121, for inspection, solder supply, or other purpose, the control blades 112 are provided with apertures 126 (Figures 4 and 25), which are positioned immediately above the pot.

Figure 24:
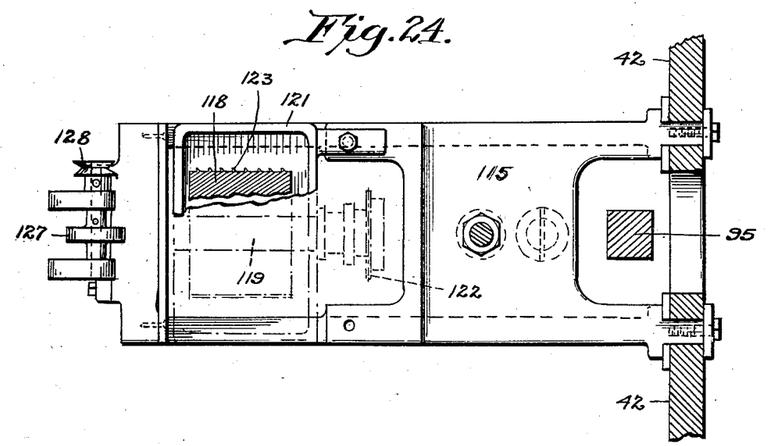
Figure 24 is a top plan view, partly broken away and partly in section, of the solder pot and its mounting.
Figure 25:
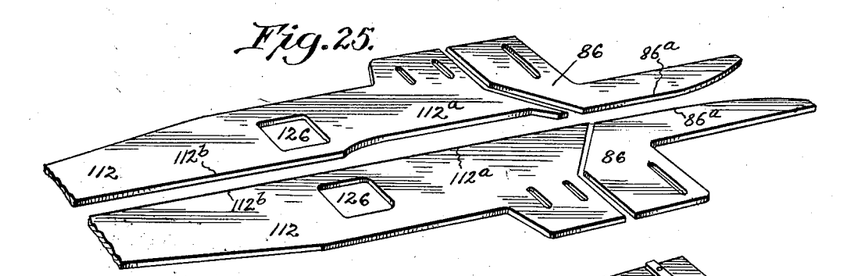
Figure 25 is a perspective view of certain control blades which guide the blank in its passage along the horn and through the machine.
Figures 26, 27, 28:
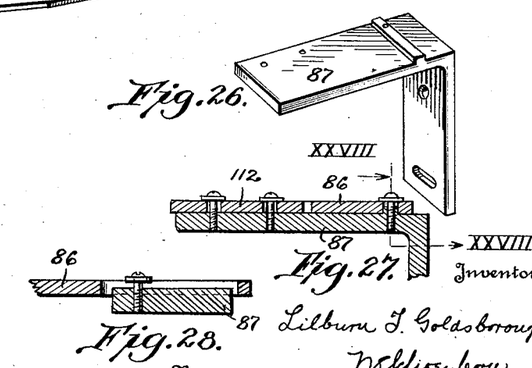
Figure 26 is a perspective view of one of certain supporting brackets on which such control blades are mounted.
Figure 27 is a sectional view on the line XXVII—XXVII, Figure 4.
Figure 28 is a similar view on the line XXVIII—XXVIII, Figure 27.

As the soldered blank passes along the horn, after the soldering operation, the joint is preferably "wiped" by a muslin wheel 127 (Figures 1, 1$^c$, 10$^a$ and 24), which is rotated, against the forward movement of the blank, by any suitable chain or belt drive, such as indicated, at 128, in Figures 1 and 24, from any desired and convenient one of the rotating shafts of the machine. This feature of the invention, while not essential, will insure a smooth, clean and even outer surface upon the soldered joint, and is, consequently, to be desired.

Figure 1C:
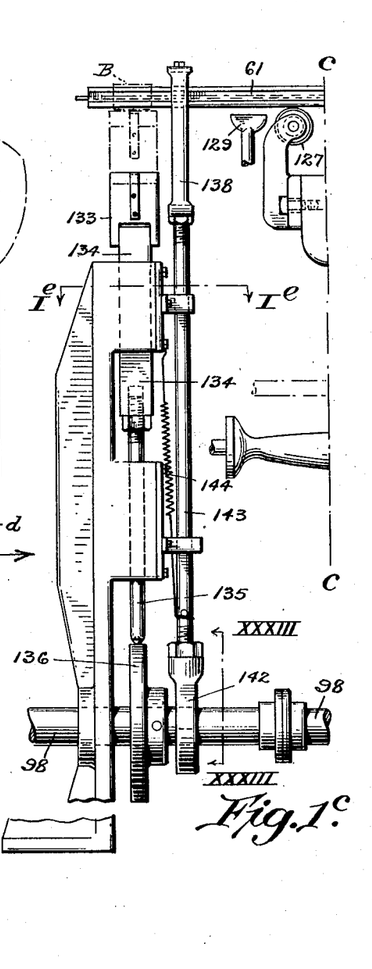
Figures 1D, 1E:
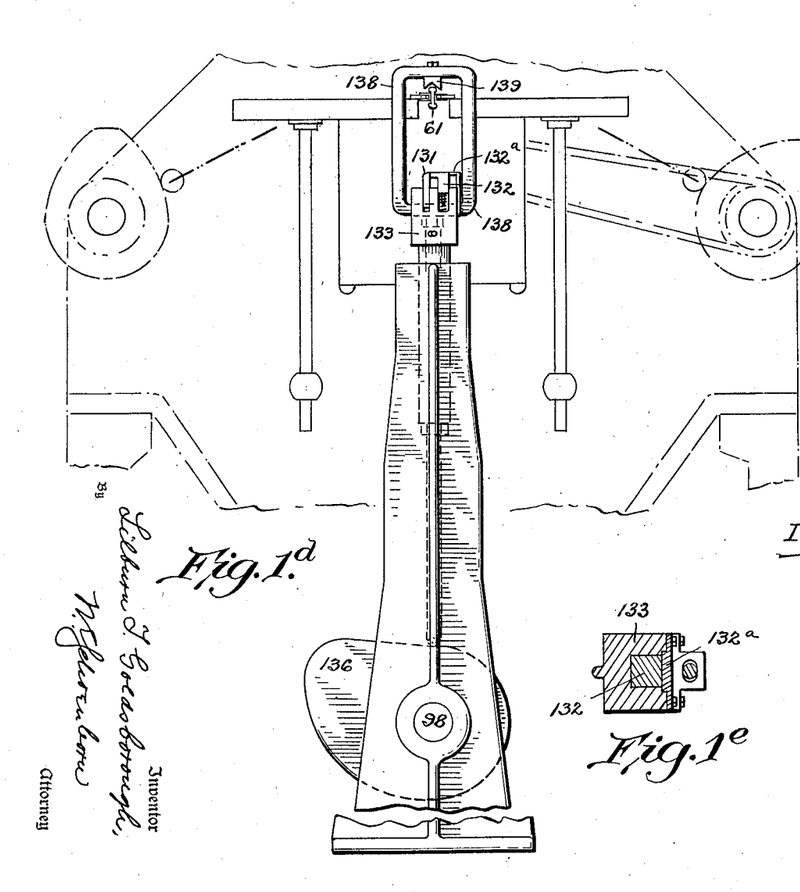

Another optional feature of the invention resides in the provision of a blower 129 (Figures 1, 1$^c$ and 10$^a$), through which a blast of air may be directed against the "wiped" joint to quickly cool the same.

The next, and final, step in the invention, is to so act upon the blank, (which, properly speaking, is no longer a "blank" but a "ferrule", and will henceforward be so termed) that the outer overlapping wing will, at a point immediately adjacent the now completed joint, be crimped inwardly to a degree equal to the thickness of the metal to provide a flush inner face for the ferrule without any offset at the edge of the inturned and overlapped end of the inner wing. This final step is effected by means of an adjustably mounted crimping finger 131 and a yieldingly mounted spring pressed holding block 132, the upward movement of which is limited by a hook 132$^a$ (Figures 1$^d$, 10$^b$, 29, 30 and 31) carried by a head 133 adjustably mounted at the upper end of a plunger 134 (Figures 1$^c$ and 1$^d$) adjustably mounted upon the upper end of a bar 135 whose lower end contacts with a cam 136 mounted on the shaft 98.

Figures 29, 30, 31, 32, 33, 34:
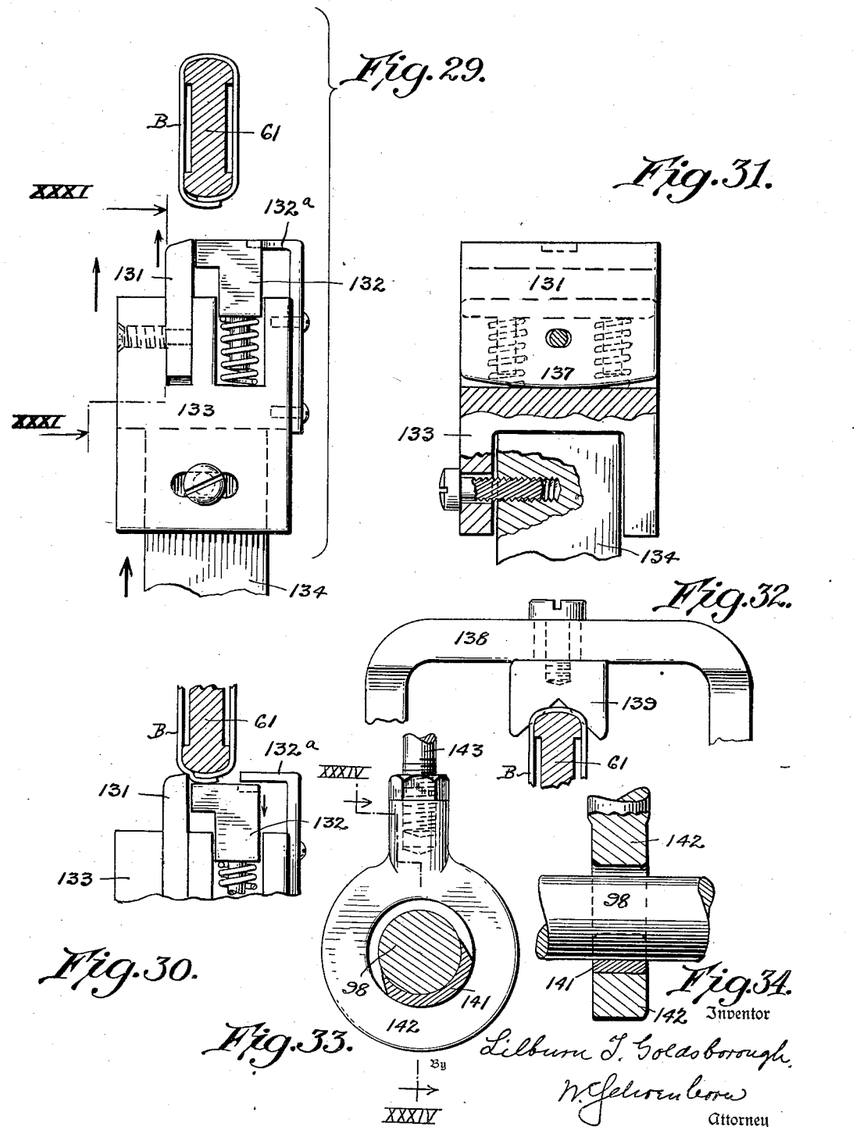

As the soldered ferrule is carried along the horn to a point above the head 133, it has an internal offset, as shown in Figure 29. The cam 136 now acts to raise the mechanism, the yielding block 132 bears against the joint of the ferrule holding it firmly against the bottom of the horn and the crimping finger 131 is pressed against the outer wing, crimping it in against the lower face of the horn, as shown in Figure 30, with the result that a smooth and flush inner face is provided within the ferrule, wherein the bristles of the brush and the cementing compound will later be placed.

To insure an even pressure of the crimping finger 131 upon the ferrule, it is provided with an arcuate base 137 (Figure 31) upon which it may rock upon the face of the head 133, and thus be self-levelling, and butt a true fair blow.

To prevent spring or yielding of the horn while the crimping operation is taking place, there is provided, inwardly beyond the position occupied by the ferrule, a yoke or bow 138 (Figures 1$^c$, 1$^d$ and 32) which embraces the horn and has secured to it a notched adjustable bearing block 139 adapted to be brought into contact with the upper face of the horn and rigidly hold the horn against all movement or vibration. Vertical movement of the yoke is controlled by means of an eccentric 141 on the shaft 98 (Figures 1°, 33 and 34) which eccentric rotates within a ring 142 adjustably mounted upon the lower end of a reciprocally mounted rod 143, the upper end of which carries the yoke 138. A spring 144 (Figure 1°) aids in maintaining the yoke and its attendant parts in normally elevated or inoperative position.

Of course, it is to be understood that by means of the different yielding and adjustable mountings of various parts throughout the machine, it may be readily set to operate upon metal of any thickness for a paint brush ferrule.

It is also quite obvious that ferrules that are, for example, circular or oval in configuration, or any other customary form, may be as readily fabricated by the practice of this invention as are the substantially rectangular ones illustrated. Nor need the fabricated ferrules be necessarily used for paint brushes, as there are other ways in which they may be utilized.

Likewise, it is obvious that many different arrangements of parts of the machine and variations in their size and relation may be effected without any departure whatever from the spirit of this invention. The specific construction shown in the accompanying drawings and described in this specification is to be considered in no wise as a limitation of the invention, it having been elected merely for the purpose of illustration. Many and sundry modifications of the invention will readily suggest themselves to those skilled in the art and will fall within the scope of the appended claims.

What I claim is:

1. The mode herein described of making a ferrule from a flat metallic blank, said mode consisting in bending such a blank at a point substantially midway of its length, overlapping the ends of such bent blank with a slightly curved surface contact to form an enclosed hollow structure tapered toward the overlapping ends, disengaging such overlapped ends from each other, and permitting the same to frictionally re-engage in overlapping relation with the former inner end on the outer side and the former outer end on the inner side.

2. The mode herein described of making a ferrule from a flat metallic blank, said mode consisting in bending such a blank at a point substantially midway of its length, overlapping the ends of such bent blank with a slightly curved surface contact to form an enclosed hollow structure tapered toward the overlapping ends, disengaging such overlapped ends from each other, permitting the same to frictionally re-engage in overlapping relation with the former inner end on the outer side and the former outer end on the inner side, and securing the re-engaged overlapping ends in such relation.

3. The mode herein described of making a ferrule from a flat metallic blank, said mode consisting in bending such a blank at a point substantially midway of its length, overlapping the ends of such bent blank with a slightly curved surface contact to form an enclosed hollow structure tapered toward the overlapping ends, disengaging such overlapped ends from each other, permitting the same to frictionally re-engage in overlapping relation with the former inner end on the outer side and the former outer end on the inner side, and soldering the re-engaged overlapping ends in such relation.

4. The mode herein described of making a ferrule from a flat metallic blank, said mode consisting in bending such a blank at a point substantially midway of its length, overlapping the ends of such bent blank to form an enclosed hollow structure, disengaging such overlapping ends from each other, permitting the same to frictionally re-engage in slightly curved overlapping relation with the former inner end on the outer side and the former outer end on the inner side, and off setting the outer end at a point adjacent its overlapping portion so that the enclosed hollow structure has a flush inner face.

5. The mode herein described of making a ferrule from a flat metallic blank, said mode consisting in bending such a blank at a point substantially midway of its length, overlapping the ends of such bent blank to form an enclosed hollow structure, disengaging such overlapping ends from each other, permitting the same to frictionally re-engage in slightly curved overlapping relation with the former inner end on the outer side and the former outer end on the inner side, securing the re-engaged overlapping ends in such relation, and off setting the outer end at a point adjacent its secured overlapping portion so that the enclosed hollow structure has a flush inner face.

6. The mode herein described of making a ferrule from a flat metallic blank, said mode consisting in bending such a blank at a point substantially midway of its length, overlapping the ends of such bent blank to form an enclosed hollow structure, disengaging such overlapping ends from each other, permitting the same to frictionally re-engage in slightly curved overlapping relation with the former inner end on the outer side and the former outer end on the inner side, soldering the re-engaged overlapping ends in such relation, and off setting the outer end at a point adjacent its soldered overlapping portion so that the enclosed hollow structure has a flush inner face.

7. The mode herein described of making a ferrule from a flat metallic blank, said mode consisting in bending such a blank at a point substantially midway of its length so that it has two wings, overlapping the ends of such wings to form an enclosed hollow structure, disengaging the overlapping ends of the wings, and permitting the same to frictionally re-engage in slightly curved overlapping relation with the former inner end on the outer side and the former outer end on the inner side.

8. The mode herein described of making a ferrule from a flat metallic blank, said mode consisting in bending such a blank at a point substantially midway of its length so that it has two wings, overlapping the ends of such wings to form an enclosed hollow structure, disengaging the overlapping ends of the wings, permitting the same to frictionally re-engage in slightly curved overlapping relation with the former inner end on the outer side and the former outer end on the inner side, and securing the overlapping ends of the wings in such relation.

9. The mode herein described of making a ferrule from a flat metallic blank, said mode consisting in bending such a blank at a point substantially midway of its length so that it has two wings, overlapping the ends of such wings to form an enclosed substantially rectangular hollow structure tapering slightly towards the overlapping ends, disengaging the overlapping ends of the wings, permitting the same to frictionally re-engage in overlapping relation with the former inner end on the outer side and the former outer end on the inner side, and soldering the overlapping ends of the wings in such relation.

10. The combination, in a machine for forming ferrules from flat metallic blanks, of a horn, of blank feeding means cooperating with said horn, blank bending means which bends and overlaps the free ends of a blank, and means for temporarily disengaging the overlapped ends of the blank but permitting them to reengage in overlapping relation but with the former inner end on the outside and the former outer end on the inside.

11. The combination, in a machine for forming ferrules from flat metallic blanks, of a horn, of blank feeding means cooperating with said horn, blank bending means which bends and overlaps the free ends of a blank, means for temporarily disengaging the overlapped ends of the blank but permitting them to re-engage in overlapping relation but with the former inner end on the outside and the former outer end on the inside, and means for fixedly securing the ends in such relation.

12. The combination, in a machine for forming ferrules from flat metallic blanks, of a horn, of blank feeding means cooperating with said horn, blank bending means which bends and overlaps the free ends of a blank, means for temporarily disengaging the overlapped ends of the blank but permitting them to re-engage in overlapping relation but with the former inner end on the outside and the former outer end on the inside, and means for fixedly soldering the ends in such relation.

13. The combination, in a machine for forming ferrules from flat metallic blanks, of a horn, means for feeding blanks along and on said horn, means for bending each blank around said horn with its free ends overlapped thereunder, and means carried by said horn for temporarily disengaging the overlapped ends of the blank but permitting them to re-engage in overlapped relation but with the former outer end on the inside and the former inner end on the outside.

14. The combination, in a machine for forming ferrules from flat metallic blanks, of a horn, means for feeding the blanks along and on said horn, means for bending each blank around said horn with its free ends overlapped thereunder, means carried by said horn for temporarily disengaging the overlapped ends of the blank but permitting them to reengage in overlapped relation but with the former outer end on the inside and the former inner end on the outside, and means for fixedly securing the ends in such relation.

15. The combination, in a machine for forming ferrules from flat metallic blanks, of a horn, means for feeding the blanks along and on said horn, means for bending each blank around said horn with its free ends overlapped thereunder, means carried by said horn for temporarily disengaging the overlapped ends of the blank but permitting them to re-engage in overlapped relation but with the former outer end on the inside and the former inner end on the outside, and means for fixedly soldering the ends in such relation.

16. The combination, in a machine for forming ferrules from flat metallic blanks, of a horn, of blank feeding means cooperating with said horn, blank bending means which bends and overlaps the free ends of a blank, means for temporarily disengaging the overlapped ends of the blank but permitting them to re-engage in overlapping relation but with the former inner end on the outside and the former outer end on the inside, and means for off setting the outer end at a point adjacent its overlapping portion.

17. The combination, in a machine for forming ferrules from flat metallic blanks, of a horn, of blank feeding means cooperating with said horns, blank bending means which bends and overlaps the free ends of a blank, means for temporarily disengaging the overlapped ends of the blank but permitting them to re-engage in overlapping relation but with the former outer end on the inside and the former inner end on the outside, means for fixedly securing the ends in such relation, and means for off setting the outer end at a point adjacent its overlapping and secured portion.

18. The combination, in a machine for forming ferrules from flat metallic blanks, of a horn, of blank feeding means cooperating with said horn, blank bending means which bends and overlaps the free ends of a blank, means for temporarily disengaging the overlapped ends of the blank but permitting them to re-engage in overlapping relation but with the former outer end on the inside and the former inner end on the outside, means for fixedly soldering the ends in such relation, and means for off setting the outer end at a point adjacent its overlapping and soldered portion.

19. The combination, in a machine for forming ferrules from flat metallic blanks, of a horn, means for feeding blanks along and on said horn, means for bending each blank around said horn with its free ends overlapped thereunder, means carried by said horn for temporarily disengaging the overlapped ends of the blank but permitting them to re-engage in overlapped relation but with the former outer end on the inside and the former inner end on the outside, and means for off setting the outer end at a point adjacent its overlapped portion.

20. The combination, in a machine for forming ferrules from flat metallic blanks, of a horn, means for feeding blanks along and on said horn, means for bending each blank around said horn with its free ends overlapped thereunder, means carried by said horn for temporarily disengaging the overlapped ends of the blank but permitting them to re-engage in overlapped relation but with the former outer end on the inside and the former inner end on the outside, means for fixedly securing the ends in such relation, and means for off setting the outer end at a point adjacent its overlapped and secured portion.

In testimony whereof, I hereunto affix my signature.

LILBURN T. GOLDSBOROUGH.